United States Patent
Chakrabarti et al.

(10) Patent No.: US 7,870,474 B2
(45) Date of Patent: Jan. 11, 2011

(54) SYSTEM AND METHOD FOR SMOOTHING HIERARCHICAL DATA USING ISOTONIC REGRESSION

(75) Inventors: Deepayan Chakrabarti, Mountain View, CA (US); Kunal Punera, Austin, TX (US); Shanmugasundaram Ravikumar, Berkeley, CA (US)

(73) Assignee: Yahoo! Inc., San Jose, CA (US)

( * ) Notice: Subject to any disclaimer, the term of this patent is extended or adjusted under 35 U.S.C. 154(b) by 921 days.

(21) Appl. No.: 11/800,235

(22) Filed: May 4, 2007

(65) Prior Publication Data

US 2008/0275890 A1 Nov. 6, 2008

(51) Int. Cl.
*G06F 17/00* (2006.01)
(52) U.S. Cl. .................................... 715/205
(58) Field of Classification Search ............ 715/205
See application file for complete search history.

(56) References Cited

U.S. PATENT DOCUMENTS

| | | | |
|---|---|---|---|
| 6,256,629 B1* | 7/2001 | Sproat et al. .................. | 1/1 |
| 2004/0006452 A1* | 1/2004 | Gluhovsky ..................... | 703/2 |
| 2007/0009167 A1* | 1/2007 | Dance et al. .................. | 382/254 |
| 2007/0255707 A1* | 11/2007 | Tresser et al. ................. | 707/6 |
| 2008/0275901 A1 | 11/2008 | Chakrabarti et al. | |

OTHER PUBLICATIONS

Niculescu-Mizil, et al., "Predicting Good Probabilities With Supervised Learning", appearing in Proceedings of the 22nd International Conference on Machine Learning, Bonn, Germany, 2005, p. 625-632.*

Angelov, et al., "Weighted Isotonic Regression under the L1 Norm", SODA 2006, Jan. 2006, p. 783-791.*

Z. Bar-Yossef and S. Rajagopalan, Template Detection via Data Mining and its Applications, In Proc. 11th WWW, pp. 580-591, 2002.

D. Gibson, K. Punera, and A. Tomkins, The Volume and Evolution of Web Page Templates, In Proc. 14th WWW (Special Interest Tracks and Posters), pp. 830-839, 2005.

Yi et al. (see L. Yi, B. Liu, and X. Li, Eliminating Noisy Information in Web Pages for Data Mining. In Proc. 9th KDD, pp. 296-305, 2003).

Yi and Liu (see L. Yi and B. Liu, Web Page Cleaning for Web Mining through Feature Weighting, In Proc. 18th IJCAI, pp. 43-50, 2003.

(Continued)

*Primary Examiner*—Amelia Rutledge

(57) ABSTRACT

An improved system and method is provided for detecting a web page template. A web page template detector may be provided for performing page-level template detection on a web page. In general, the web page template classifier may be trained using automatically generated training data, and then the web page template classifier may be applied to web pages to identify web page templates. A web page template may be detected by classifying segments of a web page as template structures, by assigning classification scores to the segments of the web page classified as template structures, and then by smoothing the classification scores assigned to the segments of the web page. Generalized isotonic regression may be applied for smoothing scores associated with the nodes of a hierarchy by minimizing an optimization function using dynamic programming.

3 Claims, 6 Drawing Sheets

OTHER PUBLICATIONS

Vieira et al. (see K. Vieira, A. Silva, N. Pinto, E. Moura, J. Cavalcanti, and J. Freire, A Fast and Robust Method for Web Page Template Detection and Removal, In Proc. 15th CIKM, pp. 256-267, 2006).

Kao et al. (see H.-Y. Kao, J.-M. Ho, and M.-S. Chen, WISDOM: Web Intrapage Informative Structure Mining Based on Document Object Model, TKDE, 17(5):614-627, 2005).

Debnath et al. (see S. Debnath, P. Mitra, N. Pal, and C. L. Giles, Automatic Identification of Informative Sections of Web Pages, TKDE, 17(9):1233-1246, 2005).

Kao et al. (see H.-Y. Kao, M.-S. Chen, S.-H. Lin, and J.-M. Ho, Entropy-based link analysis for mining web informative structures, In Proc. 11th CIKM, pp. 574-581, 2002).

Song et al. (see R. Song, H. Liu, J.-R. Wen, and W.-Y. Ma, Learning Block Importance Models for Web Pages, In Proc. 13th WWW, pp. 203-211, 2004).

B. Davison, Recognizing Nepotistic Links on the Web, In AAAI-2000 Workshop on Artificial Intelligence for Web Search, pp. 23-28, 2000.

Kushmerick (see N. Kushmerick, Learning to Remove Internet Advertisement, In Proc. 3rd Agents, pp. 175-181, 1999).

T. Mitchell, *Machine Learning*, McGraw Hill, 1997, pages cover page to p. 143, 1997.

T. Mitchell, *Machine Learning*, McGraw Hill, 1997, pp. 144-268, 1997.

T. Mitchell, *Machine Learning*, McGraw Hill, 1997, pp. 269-414 and back page, 1997.

\* cited by examiner

SYSTEM AND METHOD FOR SMOOTHING HIERARCHICAL DATA USING ISOTONIC REGRESSION

CROSS-REFERENCE TO RELATED APPLICATIONS

The present invention is related to the following United States patent application, filed concurrently herewith and incorporated herein in its entirety:

"System and Method for Detecting a Web Page Template," Ser. No. 11/800,236.

FIELD OF THE INVENTION

The invention relates generally to computer systems, and more particularly to an improved system and method for detecting a web page template.

BACKGROUND OF THE INVENTION

The increased use of content-management systems to generate web pages has significantly enriched the browsing experience of end users. The multitude of site navigation links, sidebars, copyright notices, and timestamps provide easy-to-access and often useful information to the users. From an objective standpoint, however, these "template" structures pollute the content by digressing from the main topic of discourse of the web page. Modern search engines may only require content of web pages without such template structures for indexing, analysis and ranking of web pages for user search queries. Furthermore, template structures can cripple the performance of many modules of search engines, including the index function, ranking function, summarization function, duplicate detection function, etc. With templated content currently constituting more than half of all HTML on the web and growing steadily (see for example, Z. Bar-Yossef and S. Rajagopalan, Template Detection via Data Mining and its Applications, In Proc. 11th WWW, pages 580-591, 2002; and D. Gibson, K. Punera, and A. Tomkins, The Volume and Evolution of Web Page Templates, In Proc. 14th WWW (Special Interest Tracks and Posters), pages 830-839), it is imperative that search engines develop scalable tools and techniques to reliably detect templates on a web page.

Existing methods for template detection operate on a per web site basis by analyzing several web pages from the site and identifying content and/or structure that repeats across many pages. The problem of template detection and removal was first studied by Bar-Yossef and Rajagopalan (see Z. Bar-Yossef and S. Rajagopalan, Template Detection via Data Mining and its Applications, In Proc. 11th WWW, pages 580-591, 2002), who proposed performing site-level template detection based on segmentation of the DOM tree, followed by the selection of certain segments as candidate templates depending on their content. Yi et al. (see L. Yi, B. Liu, and X. Li, Eliminating Noisy Information in Web Pages for Data Mining. In Proc. 9th KDD, pages 296-305, 2003) and Yi and Liu (see L. Yi and B. Liu, Web Page Cleaning for Web Mining through Feature Weighting, In Proc. 18th IJCAI, pages 43-50, 2003) used a data structure called the style tree to take into account the metadata for each node, instead of its content. Vieira et al. (see K. Vieira, A. Silva, N. Pinto, E. Moura, J. Cavalcanti, and J. Freire, A Fast and Robust Method for Web Page Template Detection and Removal, In Proc. 15th CIKM, pages 256-267, 2006) proposed performing site-level template detection by mapping identical nodes and subtrees in the DOM trees of two different pages. They proposed performing the expensive task of template detection on a small number of pages, and then removing all instances of these templates from the entire site by a much cheaper approach.

While these "site-level" template detection methods offer a lot of promise, such methods are of limited use because of the following two reasons. First, site-level templates constitute only a small fraction of all templates on the web. For instance, page-and session-specific navigation aids such as "Also bought" lists, ads, etc. are not captured by the site-level notion of templates. Second, these methods are error prone when the number of pages analyzed from a site is statistically insignificant, either because the site is small, or because a large fraction of the site is yet to be crawled. In particular, they are totally inapplicable when pages from a new website are encountered for the first time.

Additionally, some page-level algorithms have also been proposed recently that may operate only on segments of a web page. For example, Kao et al. (see H.-Y. Kao, J.-M. Ho, and M.-S. Chen, WISDOM: Web Intrapage Informative Structure Mining Based on Document Object Model, TKDE, 17(5): 614-627, 2005) segment a given webpage using a greedy algorithm operating on features derived from the page. To do so, they use both page-level and site-level features such as the number of links between pages on a web-site. Debnath et al. (see S. Debnath, P. Mitra, N. Pal, and C. L. Giles, Automatic Identification of Informative Sections of Web Pages, TKDE, 17(9):1233-1246, 2005) also propose a page-level algorithm ("L-Extractor") that applies a classifier to DOM nodes, but only certain nodes are chosen for classification, based on a predefined set of tags. Kao et al. (see H.-Y. Kao, M.-S. Chen, S.-H. Lin, and J.-M. Ho, Entropy-based link analysis for mining web informative structures, In Proc. 11th CIKM, pages 574-581, 2002) propose a scheme based on information entropy to focus on the links and pages that are most information-rich, reducing the weights of template material as a by-product. Song et al. (see R. Song, H. Liu, J.-R. Wen, and W.-Y. Ma, Learning Block Importance Models for Web Pages, In Proc. 13th WWW, pages 203-211, 2004) use visual layout features of the webpage to segment it into blocks which are then judged on their salience and quality. Other local algorithms based on machine learning have been proposed to remove certain types of template material. Davison (see B. Davison, Recognizing Nepotistic Links on the Web, In AAAI-2000 Workshop on Artificial Intelligence for Web Search, pages 23-28, 2000) uses decision tree learning to detect and remove "nepotistic" links, and Kushmerick (see N. Kushmerick, Learning to Remove Internet Advertisement, In Proc. 3rd Agents, pages 175-181, 1999.) develops a browsing assistant that learns to automatically removes banner advertisements from pages.

Unfortunately, only segments of a web page may be operated upon by these algorithms, and the segments are chosen prior to any determination of the templateness of those segments. As a result, these algorithms would not be able to detect a segment that may be itself composed of several template and non-template nodes.

What is needed is a system and method that does not need multiple pages from the same website to perform template detection and that may perform template detection for any subset of a web page. Such a system and method should be easily deployed as a drop-in module in an existing web crawler work flow.

SUMMARY OF THE INVENTION

Briefly, the present invention may provide a system and method for detecting a web page template. Briefly, the present invention may provide a system and method for detecting a web page template. In an embodiment, a web page template detector may be provided for performing page-level template detection on a web page. The web page template detector may include an operably coupled web page template classifier for identifying a web page template that represents web site information on the web page. The web page template detector may also include an operably coupled isotonic smoothing engine for smoothing templateness scores assigned by the web page template classifier using generalized isotonic regression on a tree. In general, the web page template classifier may be trained using automatically generated training data, and then the web page template classifier may be applied to web pages to identify web page templates.

The present invention may detect a web page template by classifying segments of a web page as template structures, by assigning classification scores to the segments of the web page classified as template structures, and then by smoothing the classification scores assigned to the segments of the web page. In order to classify segments of a web page as template structures, the web page may be preprocessed to extract features for identifying the template structures. Additionally, logistic regression classifiers may be trained over a set of features for identifying the template structures.

The present invention may also provide a system and method for smoothing scores associated with the nodes of a hierarchy using generalized isotonic regression. In particular, the templateness scores associated with DOM nodes of a web page are smoothed, and, as a result, the isotonic smoothing provides a segmentation of the web page into template and non-template regions. The generalized isotonic regression may be applied to scores associated with nodes of a hierarchy by building an error data structure for storing an error value for each node of the hierarchy, computing an error function for each node of the hierarchy which may represent the cost of the optimal smoothed score in a subtree rooted at a node, and smoothing the scores by minimizing an optimization function using dynamic programming. In an embodiment, a cost function having a distance function and having a penalty term representing a cost of a smoothed score may be minimized.

The present invention may support many online applications. For example, template detection at the page-level may be used as a pre-processing step to web mining applications such as duplicate detection and web page classification. Moreover, an off-the-shelf classifier may be used in the framework, instead of having to design one that works specifically for the given hierarchical structure. Other advantages will become apparent from the following detailed description when taken in conjunction with the drawings, in which:

DETAILED DESCRIPTION

Exemplary Operating Environment

Figure 1:
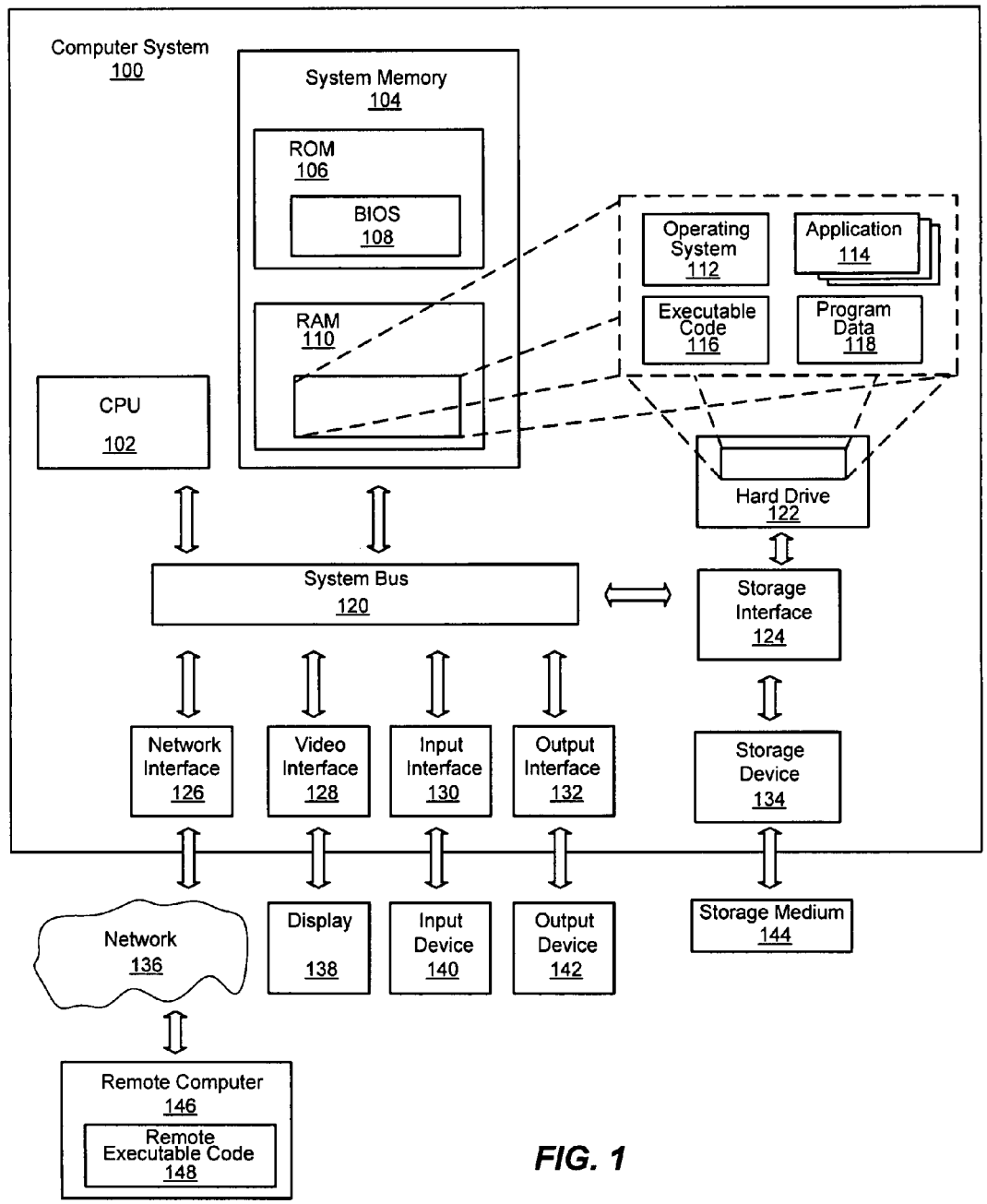
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that-are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Detecting a Web Page Template

The present invention is generally directed towards a system and method for detecting a web page template. In general, a web template classifier may be trained using automatically generated training data, and then the web template classifier may be applied to web pages to identify web page templates. Segments of a web page may be classified as a template structure, and templateness scores assigned to segments of the web page as a result of classification may then be smoothed using an isotonic smoothing algorithm. As used herein, a web page template means information about a web page or web site that may be distinguished from main content published on the web page. For example, a web page template may represent site navigation links, sidebars, copyright notices, and timestamps.

As will be seen, the isotonic smoothing algorithm provides a segmentation of the web page into template and non-template regions. Moreover, template detection at the page-level may be used as a pre-processing step to web mining applications such as duplicate detection and web page classification. As will be understood, the various block diagrams, flow charts and scenarios described herein are only examples, and there are many other scenarios to which the present invention will apply.

Figure 2:
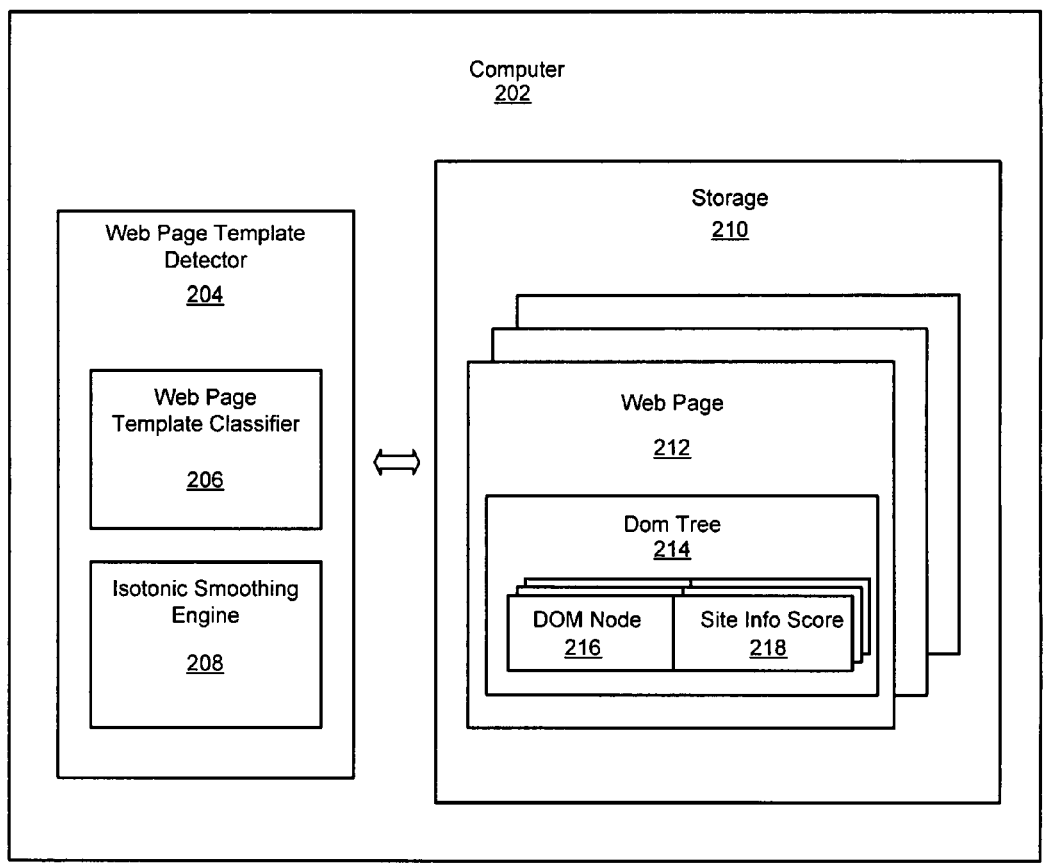
FIG. 2 is a block diagram generally representing an exemplary architecture of system components in an embodiment for detecting a web page template, in accordance with an aspect of the present invention.

Turning to FIG. 2 of the drawings, there is shown a block diagram generally representing an exemplary architecture of system components for detecting a web page template. Those skilled in the art will appreciate that the functionality implemented within the blocks illustrated in the diagram may be implemented as separate components or the functionality of several or all of the blocks may be implemented within a single component. For example, the functionality for the isotonic smoothing engine 208 may be included in the same component as the web page template classifier 206. Or the functionality of the isotonic smoothing engine 208 may be implemented as a separate component from the web page template detector 204.

In various embodiments, a computer 202, such as computer system 100 of FIG. 1, may include a web page template detector 204 operably coupled to storage 210. In general, the web page template detector 204 may be any type of executable software code such as a kernel component, an application program, a linked library, an object with methods, and so forth. The storage 210 may be any type of computer-readable media and may store web pages 212, or links to web pages such as URLs. Each of the web pages 212 may be represented by a DOM tree 214 that may include one or more DOM nodes 216 that may each have a site information score 218 representing the likelihood that the DOM node has information about the web site that may be distinguished from content published on the corresponding web page.

The web page template detector 204 may provide services for detecting a web page template that may include web site information on a web page. A web page may be any information that may be addressable by a URL, including a document, an image, audio, and so forth. The web page detector 204 may include a web page template classifier 206 for identifying a web page template that represents web site information of a web page 212, and an isotonic smoothing engine 208 for smoothing site information scores 218 associated with DOM nodes of the web page 212. Each of these modules may also be any type of executable software code such as a kernel component, an application program, a linked library, an object with methods, or other type of executable software code.

A web page may be an HTML document represented by a DOM tree where each node in the DOM tree corresponds to an HTML fragment. Each DOM node may be identified with the HTML fragment that it may represent. Let T be the rooted DOM tree corresponding to the HTML document. Accordingly, the tree T may represent an embodiment of a web page. Consider templ(T) to denote the set of nodes in T that are web page templates. Consider $i \in T$ to denote that node i belongs to tree T, parent(i) to denote the parent of i in T, child(i) to denote the set of children of i in T, and root(T) to denote the root of T.

Furthermore, consider H to denote the set of possible DOM nodes. In the page-level template detection problem, we seek a boolean function $\tau: H \to \{0,1\}$ such that for all $i \in \text{templ}(T)$, $\tau(i)=1$, and for all $i \notin \text{templ}(T)$, $\tau(i)=0$. In a relaxed version of the problem, we seek a function $\tilde{\tau}: H \to [0,1]$ where if $i \in \text{templ}(T)$ and $j \notin \text{templ}(T)$, then $\tilde{\tau}(i) > \tilde{\tau}(j)$; using an appropriate threshold, we can round $\tilde{\tau}$ to make it boolean.

A first-cut approach to page-level template detection would be to extract sufficiently rich features from the DOM nodes (in the context of a page) and train a classifier $x: H \to [0,1]$ to score the "templateness" of each node in a given page. While this appears plausible, it has several issues when scrutinized closely. The first set of issues revolve around the construction of the training data for the classifier. For the classifier to learn the notion of "templateness" of DOM nodes on the web in general, it must be trained comprehensively over all forms of templates that it is likely to encounter. The heterogeneity and scale of the web imply that a huge corpus of accurate and diverse training data will be required. These requirements present a daunting task that demands tremendous human effort. Secondly, this approach to classification ignores the global property of templateness monotonicity in the DOM tree, crisply stated as follows: a node in the tree is a template if and only if all its children are templates. In other words, the function $\tau(\cdot)$ is monotone on the tree. As is apparent, by working on each node of T in isolation, a naive classifier may miss this intuitive relationship among templateness of nodes in the tree.

Figure 3:
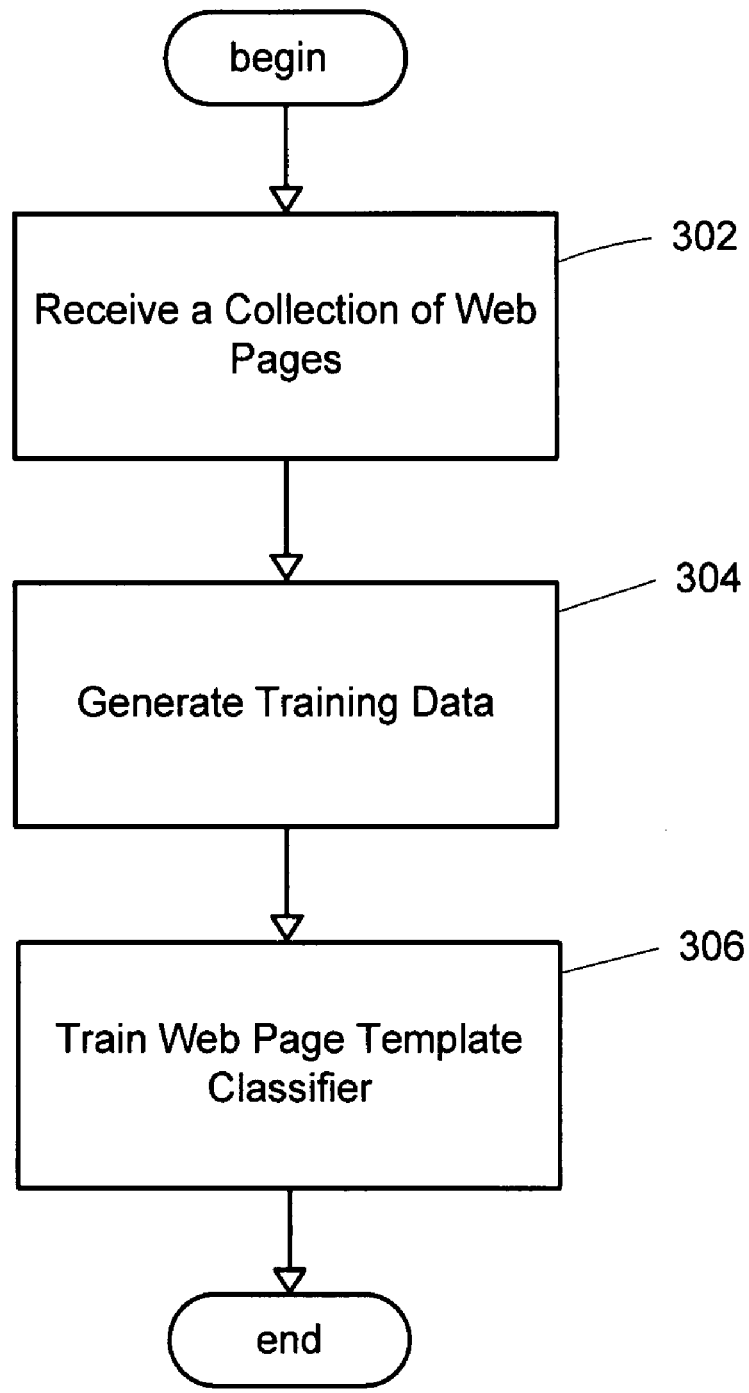
FIG. 3 is a flowchart generally representing the steps undertaken in one embodiment for training a web template classifier using automatically generated training data, in accordance with an aspect of the present invention.

A framework is presented to allow template detection for a web page. In general, a web template classifier may be trained using the automatically generated training data, and then the web template classifier may be applied to web pages for template detection. FIG. 3 presents a flowchart generally representing the steps undertaken in one embodiment for training a web template classifier using automatically generated training data. At step 302, a collection of web pages may be received. In an embodiment, the collection of web pages may represent web pages from several web sites. Training data may then be generated at step 304 using the collection of web pages received.

The step of automatic generation of training data may be accomplished in an embodiment using site-level template detection as described by D. Gibson, K. Punera, and A. Tomkins, *The Volume and Evolution of Web Page Templates*, In Proc. 14th WWW (Special Interest Tracks and Posters), pages 830-839, 2005. Note that even though site-level template detection is less feasible as a web-scale template detection mechanism, it may still be used to generate training data to train a web page template classifier. The basic intuition behind the site-level template detection approach is the following. One of the common properties of templates is that they occur repeatedly across many pages on a single site. Therefore, if a DOM node occurs many times on different pages from a single site, then it lends credible evidence that this DOM node perhaps corresponds to a template.

For example, a generic algorithm that may be called SiteLevel ($\theta$) may be used in various embodiments which may operate on a site by site basis. For each site, SiteLevel ($\theta$) may obtain a set $\Gamma$ of random pages from the site. Then, for each page $T \in \Gamma$ and for every DOM node $i \in T$, SiteLevel ($\theta$) may compute h(i), where h($\cdot$) may be a random hash function. Consider $I^+ \subseteq \cup_{T \in \Gamma} T$ to be the set of DOM nodes that may occur on at least $\theta$ fraction of pages in $\Gamma$. Note that this set of DOM nodes can be identified efficiently using hashes. SiteLevel ($\theta$) may return $I^+$ as the set of DOM nodes deemed templates.

Once training data may be generated, a classifier may be trained to identify a template for a web page at step 306. For example, a set of DOM nodes $I^+$ identified by SiteLevel ($\theta$) may be used as training data for a classifier. Features of DOM nodes in $I^+$ may be identified in the context of the web pages that may be indicative that a DOM node may be a template. A classifier $x: H \to [0,1]$ may then be trained in an embodiment using these features of the DOM nodes, treating those in $I^+$ as positive examples. The output of the classifier may be a templateness score (or site information score) for a given DOM node in a tree. Advantageously, a classifier may be able to distill features from site-level templates that can be generalized to other templates on the web. This may help identify templates that don't manifest themselves by repeatedly occurring across multiple pages on a web site. This may include templates that a pure site-level template detection approach cannot discover by itself.

Figure 4:
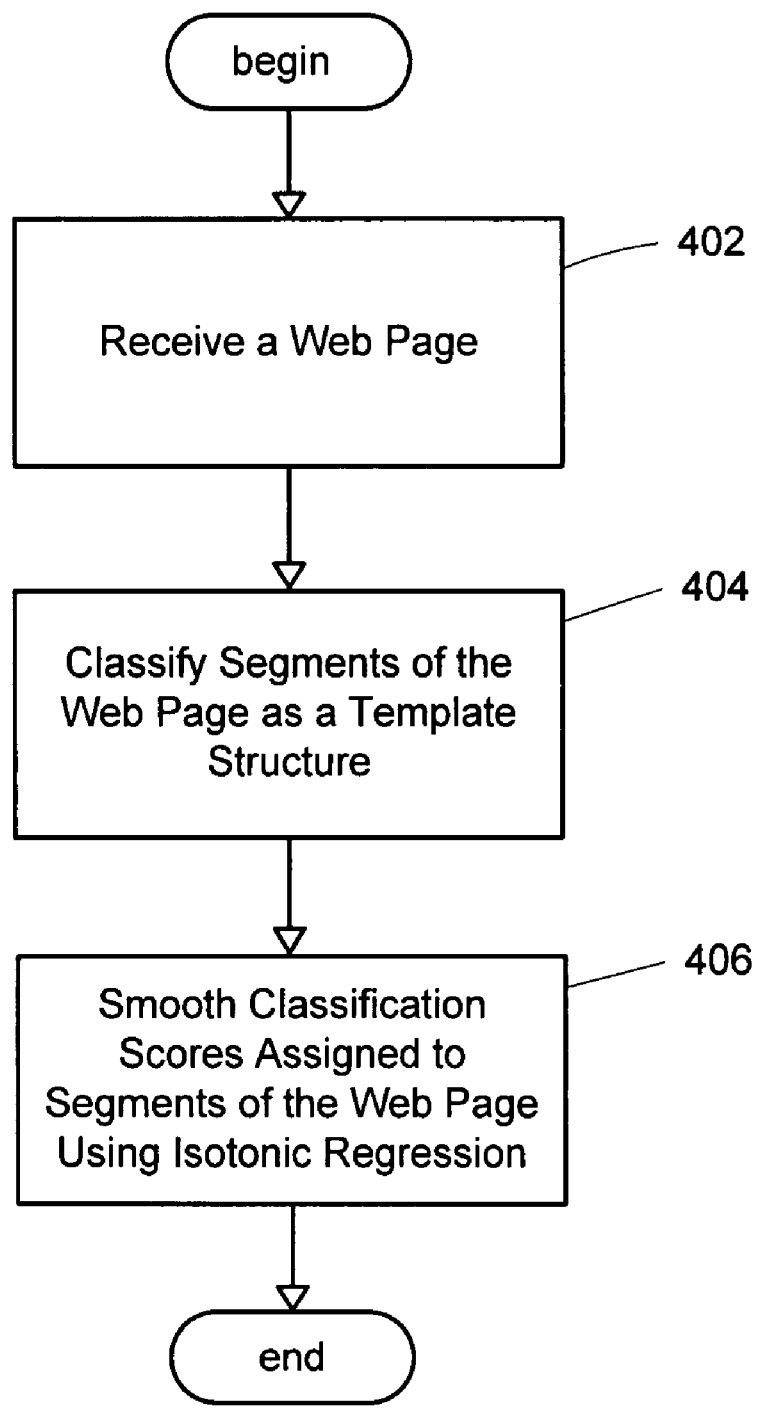
FIG. 4 is a flowchart generally representing the steps undertaken in one embodiment for identifying web page templates using a trained web template classifier, in accordance with an aspect of the present invention.

Once the web page template classifier may be trained to detect web page templates, the web page template classifier may be applied to web pages to identify web page templates. FIG. 4 presents a flowchart generally representing the steps undertaken in one embodiment for identifying web page templates using a trained web template classifier. At step 402, a web page may be received and segments of the web page may be classified as a template structure at step 404. At step 406, templateness scores assigned to segments of the web page as a result of classification may be smoothed using isotonic regression.

Although the classifier may be used to assign a templateness score x( ) to each DOM node in the given page T, such a templateness scores assigned by the classifier to each DOM node in isolation of other DOM nodes may not satisfy the property of templateness monotonicity that a node is a template if and only if all its children are templates. On the other hand, assuming the classifier has reasonable accuracy, the scores it assigns may make sense for most, if not for all, of the nodes.

In order to reconcile the score assigned by the classifier with the monotonicity property of the templates, consider a natural generalization of the monotonicity property for the case of real valued templateness scores. Assume y(i) may denote the templateness score of a node i in the tree. Then, y(·) may satisfy generalized templateness monotonicity if for every internal node i, with children $j_1, \ldots, j_l$, $y(i)=\min\{y(j_1), \ldots, y(j_l)\}$, i.e., the templateness of an internal node is the equal to the least of its children's templateness scores.

Note that generalized monotonicity ensures, first, that the templateness score of a node is at least the templateness score of its parent, and second, that the templateness score of the parent equals the templateness score of all its children, when the children all have same templateness score. In addition, the templateness score y( ) may be required to be close to the x( ) scores assigned by the classifier. Together, generalized monotonicity with this closeness requirement gives rise to the problem of generalized isotonic regression on trees. Smoothing the output of the classifier on individual nodes of the tree may be represented as the following generalized isotonic regression problem for a distance function d(·,·): given a tree T and a function x:T→+[0,1], find a function y:T→[0,1] such that y(·) and d(x,y) may be minimized and for every internal node i, with children $j_1, \ldots, j_l$, $y(i) \leq \min\{y(j_1), \ldots, y(j_l)\}$, i.e., the templateness of an internal node is at most the least of its children's templateness scores. By applying isotonic smoothing-to templateness scores, a sectioning of a web page into segments may be obtained. This may be useful in many applications, including finding web pages with duplicate content and web page classification.

Figure 5:
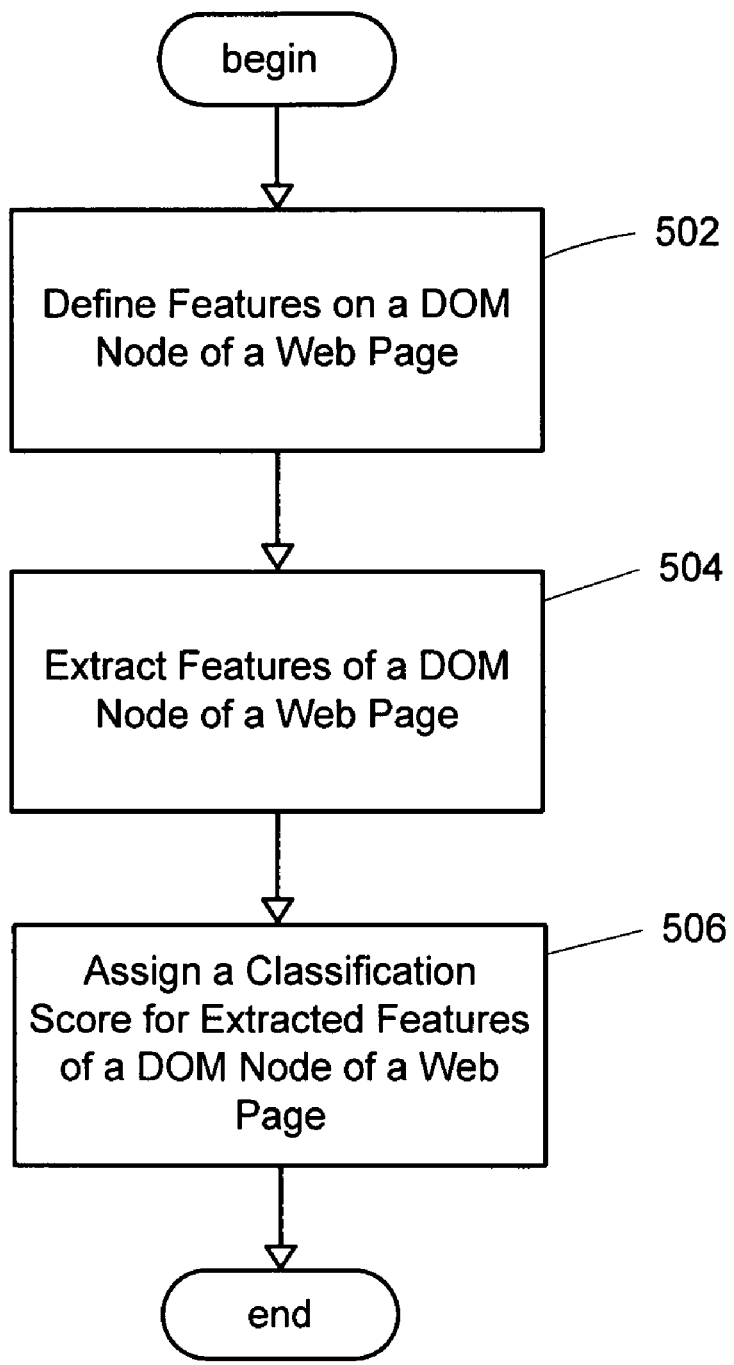
FIG. 5 is a flowchart generally representing the steps undertaken in one embodiment for classifying segments of a web page as a template structure, in accordance with an aspect of the present invention.

FIG. 5 presents a flowchart generally representing the steps undertaken in one embodiment for classifying segments of a web page as a template structure. At step 502, features may be defined on a DOM node of a web page, and then features of a DOM node of a web page may be extracted at step 504. In an embodiment, a web page may be preprocessed and parsed so that features can be extracted for its DOM nodes. The preprocessing step may involve cleaning the HTML code, for instance by using Hypar2, annotating the DOM nodes with position and area information, for example by using Mozilla3, and parsing the HTML code to obtain a DOM tree structure. The text in the HTML page may also be processed to remove stop words.

The training data employed for learning corresponds to site-level templates. However, the classifier should generalize the site-level definition of the template in the training data to a global definition of a template. This may make the process of feature extraction very critical. From each DOM node, features may be extracted that may be indicative of whether or not that DOM node may be a template. For example, intuitively, if the text within a DOM node shares a lot of words with the title of the web page, then perhaps it may not be a template node. Similarly, the distance of a DOM node from the center for the page may indicate its importance to the main purpose of the page, and hence its templateness.

In a similar fashion, several other features may be constructed from the position and area annotations of DOM nodes as well as from the text, links, and anchortext they may contain. Some of the most discriminative features include: closeness to the margins of the webpage, number of links per word, fraction of text within anchors, the size of the anchors, fraction of links that are intra-site, and the ratio of visible characters to HTML content.

At step 506, a templateness score may then be assigned to DOM nodes of the web page for extracted features of the DOM node. To do so, Logistic regression classifiers (see T. Mitchell, *Machine Learning*, McGraw Hill, 1997) may be trained over the set of features described above. Apart from performing very well, these classifiers may have the additional benefit that their classification output can be interpreted as the probability of belonging to the predicted class. In exploratory experiments, distributions of feature values may be observed to vary heavily depending on the area of the DOM node, perhaps because template and non-template nodes have very different characteristics at different levels of the DOM trees. Because these levels can be approximated by the area of the node, four logistic regression models may be trained in an embodiment for DOM nodes of different sizes. Given a web page, the appropriate logistic model may be applied to each node of the DOM tree, and the output probabilities may be smoothed using isotonic regression.

There are many advantages of the framework presented for detecting web page templates. Importantly, the overall framework is simple and modular. Moreover, an off-the-shelf classifier may be used in the framework, instead of having to design one that works specifically for the given DOM tree structure.

Isotonic Smoothing

In order to reconcile the score assigned by the classifier with the monotonicity property of the templates, a generalized isotonic regression on trees is formulated and solved for smoothing templateness scores assigned to segments of a web page. Recall that a DOM tree with each node labeled by a score assigned by the classifier may be given as input and the purpose of isotonic regression on trees is to smooth the templateness scores assigned so that the scores satisfy the monotonicity constraints, while remaining as faithful as possible to the original classifier scores. Consider x(i) be the classifier score for each node i∈T and consider y(i) be the smoothed score we wish to obtain.

The generalized monotonicity property may be modified in an embodiment in two ways. First, the monotonicity property may be relaxed to only ensure that the templateness score of a node is at most the least of its children's scores, instead of equal to it. This relaxation is derived from the current domain in which the cost of misclassifying a non-template as a template may be much higher than vice versa. Hence, if according to the classifier an internal node's template score is much lower than that of all of its children, then that should be respected. Second, a regularization may be introduced that penalizes if, for a node i, the templateness score y(i) is different from those of its children $j(j_1), \ldots, y(j_k)$. Clearly, if $y(j_1)=\ldots=y(j_k)$, then this regularization will try to ensure that $y(i)=y(j_1)$.

Thus, for every internal node i with children $j_1, \ldots, j_l$, $y(i) \leq \min\{y(j_1), \ldots, y(j_l)\}$. For purposes of regularization, the notion of a compressed score may be developed that embodies sectioning of the DOM tree into subtrees. A compressed score is a function $\hat{y}:T\to[0,1]\cup\{\perp\}$ with the following properties: $\hat{y}(\text{root}(T))\neq\perp$, and if i is an ancestor of j and $\hat{y}(i)\neq\perp\neq\hat{y}(j)$, then $\hat{y}(i)<\hat{y}(j)$. Also consider the size $|\hat{y}|$ of the compressed score to denote the number of places where $\hat{y}$ is defined:

$$\hat{y}=|\{i|i\in T, \hat{y}(i)\neq\perp\}|.$$

Furthermore, for all i∈T such that $\hat{y}(i)=\perp$, consider anc(i) be the closest ancestor of i such that $\hat{y}(\text{anc}(i))\neq\perp$. Note that such an ancestor must always exists since $\hat{y}(\text{root}(T))\neq\perp$. Consider that $\hat{y}$ may be interpolated to a unique y as follows:

$$y(i) = \begin{cases} \hat{y}(anc(i)) & \text{if } \hat{y} = \perp \\ \hat{y}(i) & \text{otherwise.} \end{cases}$$

It is clear that if $\hat{y}$ satisfies $\hat{y}(root(T)) \neq \perp$ and $\hat{y}(i) < \hat{y}(j)$, if i is an ancestor of j and $\hat{y}(i) \neq \perp \neq \hat{y}(j)$, then the corresponding interpolated y satisfies the property of templateness monotonicity that a node is a template if and only if all its children are templates. Also, given a y satisfying the property of templateness monotonicity, it is easy to construct the unique $\hat{y}$. Accordingly, from now on, the smoothed score y and its compressed counterpart $\hat{y}$ may be used herein interchangeably.

Finally, the cost of a smoothed score y with respect to x may be defined as $c(y) = \gamma \cdot |\hat{y}| + d(x,y)$, where $\gamma$ is a penalty term that captures the cost of each new smoothed score and $d(\cdot,\cdot)$ is some distance function. It is also possible to have a node-specific penalty term $\gamma_i$ for node i; for simplicity of exposition, the algorithm may be stated in terms of a node-independent term $\gamma$. This cost function and the tree structure lead to a regularized version of the isotonic regression problem, namely a regularized tree isotonic regression as follows: given a tree T and $x:T \rightarrow [0,1]$, find $y:T \rightarrow [0,1]$ that satisfies $y(i) \leq \min\{y(j_1), \ldots, y(j_l)\}$ for every internal node i with children $j_1, \ldots, j_l$ and minimizes $c(y) = \gamma \cdot |\hat{y}| + d(x,y)$. In an embodiment, $d(\cdot,\cdot)$ may be considered to be the $L_1$ norm since it is robust against outliers.

Before presenting an embodiment of an algorithm for a regularized tree isotonic regression, a key property of the $L_1$ distance measure may be discussed that aids in designing an efficient algorithm for this problem. It may be shown that the optimal smoothed scores in y can only come from the classifier scores in x. There exists an optimal solution, $\hat{y}$, where, for all $i \in T$, if $\hat{y}(i) \neq \perp$, then there is a $j \in T$ such that $\hat{y}(i) = x(j)$.

Although isotonic regression has been considered before in statistics and computer science contexts without imposition of a hierarchical order, here an isotonic regression is considered for a hierarchy where the $y_i$'s may have a given partial order, such as a hierarchical order imposed by a tree. A dynamic program may be built using the above result to obtain an algorithm for the regularized tree isotonic regression problem.

Figure 6:
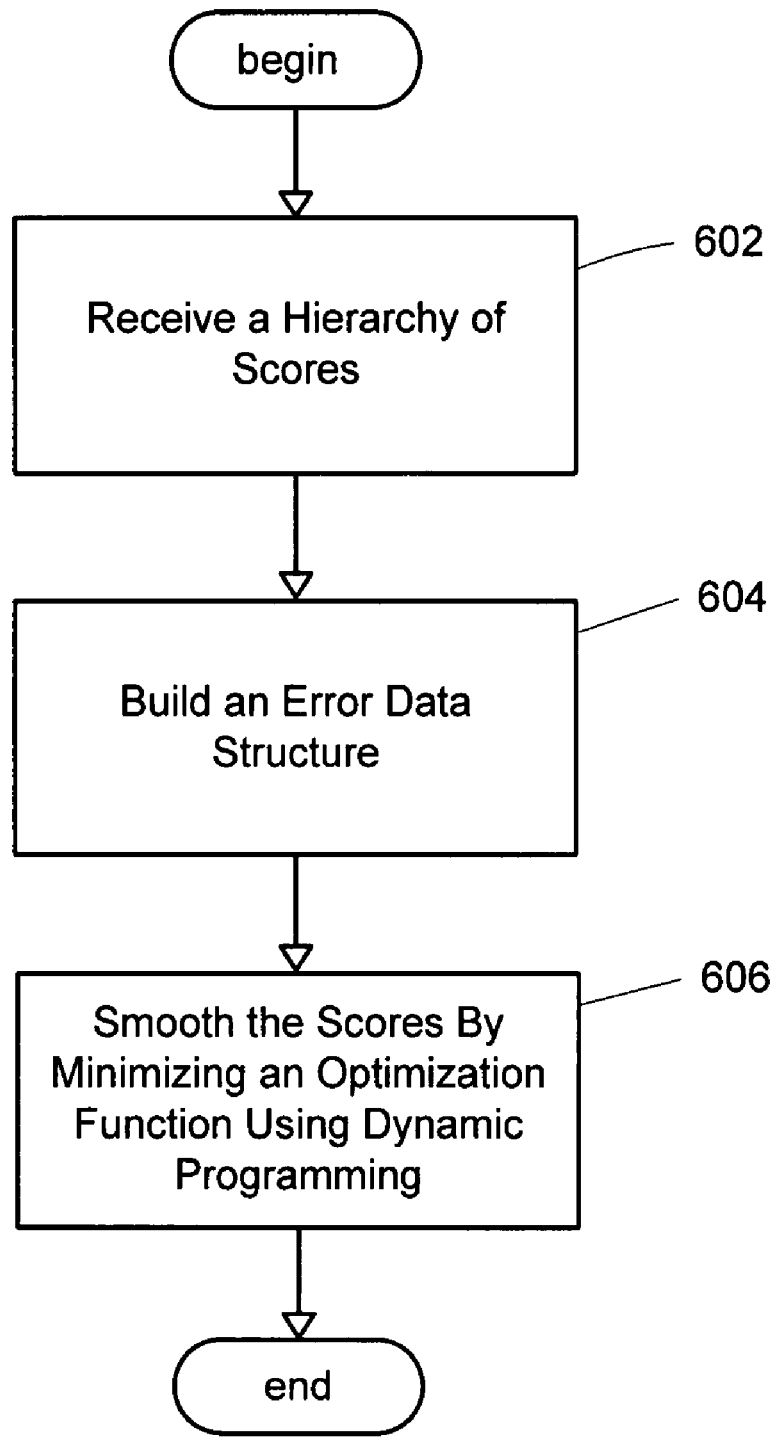
FIG. 6 is a flowchart generally representing the steps undertaken in one embodiment for performing generalized isotonic regression on a tree, in accordance with an aspect of the present invention.

FIG. 6 presents a flowchart generally representing the steps undertaken in one embodiment for performing generalized isotonic regression on a tree. At step 602, a hierarchy of scores may be received. In an embodiment, the scores may be organized in a tree such as templateness scores defined on DOM nodes of a web page. A data structure may be built at step 604 that may represent an error function for each node of the tree. In an embodiment, the algorithm BuildError may build up an index function val(i,j) and an error function err(i,j) for each node $i \in T$. The value err(i,j) represents the cost of the optimal smoothed scores in the subtree rooted at i if its parent node has the smoothed score y(parent(i))=x(j). In this situation, the index val(i,j) is such that the optimal smoothed score for node i is given by y(i)=x(val(i,j)).

If val(i,j) is the same as j, i.e, the optimal value for i and parent(i) are the same x(j), then the only cost is the $L_1$ distance between x(i) and x(val(i,j)), otherwise there is an additional $\gamma$ cost as well. The algorithm may computes this error function by first computing errors as if the additional $\gamma$ cost must always be added; this intermediate result is stored in the err' array, where err'(j) is the error if the node under consideration has the smoothed score y(i)=x(j). Then, it chooses between (a) continuing with the parent's value and subtracting $\gamma$ from the corresponding cost err', or (b) creating a new section with a new value and paying in full the corresponding cost in err'.

The pseudocode for the Algorithm BuildError is presented in an embodiment as follows:

```
Algorithm BuildError (i,x,γ)
    if (i is a leaf) then
        1. for j ∈ T /* all values node i can take */
            if (x(i) – x(j) > γ) then
                err(i,j) = γ; val(i,j) = i
            else
                err(i,j) = |x(i) – x(j)|; val(i,j) = j
    else
        2. for child u of node i
            BuildError(u, x, γ)
        3. for j ∈ T /* all values node i can take */
```

$$err'(j) = |x(i) - x(j)| + \sum_{k \in child(i)} err(k, j) + \gamma$$

```
        4. for j ∈ T /*all values node parent(i) can take */
            val* = argmin_{k∈T, x(k)>x(j)} err'(k)
            err* = err'(val*)
            if (err'(j) – γ · ≧ err* or i = root(T)) then
                err(i,j) = err*; val(i,j) = val*
            else
                err(i,j) = err'(j) – γ; val(i,j) = j
```

Returning to FIG. 6, the scores may be smoothed by minimizing an optimization function using dynamic programming at step 606. Once the error functions have been computed, the optimal smoothed scores may be obtained in an embodiment using Algorithm IsotoneSmooth, which starts with the best index p(root(T)) at the root, and progressively finds the best index $p(\cdot)$ for nodes lower down in the tree.

The pseudocode for the Algorithm IsotoneSmooth is presented in an embodiment as follows:

Algorithm IsotoheSmooth (err, val)
   val*=arg $\min_{i \in T}$ err$_{root(T)}$ (X(i))
   p(root(T))=val*; y(root(T))=x(val*)
   for i in a breadth-first search order of T
   p(i)=val(i,p(parent(i))); y(i)=x(p$_i$)

Thus the algorithm IsotoneSmooth solves the regularized tree isotonic regression problem. To do so, the algorithm may compute from the bottom up the optimal smoothed scores for each subtree, i.e., the err$(\cdot,\cdot)$ arrays, while maintaining the property of templateness monotonicity for possible smoothed score of the parent. Because there exists an optimal solution, $\hat{y}$, where, for all $i \in T$, if $\hat{y}(i) \neq \perp$, then there is a $j \in T$ such that $\hat{y}(i) = x(j)$, the parent can take only finitely many smoothed scores in the optimal solution, and because for all nodes j in the subtree of i, y(j)=z(j), combining the optimal smoothed scores for subtrees yields the optimal smoothed scores for the entire tree.

As can be seen from the foregoing detailed description, the present invention provides an improved system and method for detecting a web page template. A framework is provided to automatically build a page-level templateness classifier. Training data may be generated by applying a site-level template detection method on several randomly selected sites. Next, appropriate features for these site-level templates may be defined and extracted. Finally, this automatically generated data may be used to train a classifier that can assign a templateness score to nodes in a DOM tree. Advantageously, the web page template classifier generalizes beyond its site-level training data and can also discover templates that manifest only at the page-level.

Moreover, the framework presented formulates a monotone property that relates templateness scores across nodes of the DOM tree so that a node in the DOM tree is a template if and only if all its children are templates. A regularized isotonic regression on a tree may be solved using an efficient algorithm to find smoothed scores that are not far from the classifier scores assigned at the nodes of a tree, but satisfy a relaxed monotonicity property. Advantageously, the framework also provides a sectioning of a web page into segments which may be useful in many applications including applications for finding web pages with duplicate content and applications for web page classification. As a result, the system and method provide significant advantages and benefits needed in contemporary computing and in online applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for smoothing scores, comprising:
   a plurality of scores associated with nodes of a hierarchy;
   an isotonic smoothing engine for smoothing the plurality of scores associated with the nodes of the hierarchy using generalized isotonic regression; and
   a storage operably coupled to the isotonic smoothing engine for storing the plurality of scores associated with the nodes of the hierarchy,
   wherein the storage operably coupled to the isotonic smoothing engine for storing the plurality of scores associated with the nodes of the hierarchy comprises a storage operably coupled to the isotonic smoothing engine for storing a plurality of templateness scores associated with DOM nodes of a web page.

2. A computer system for smoothing scores, comprising:
   a plurality of scores associated with nodes of a hierarchy;
   an isotonic smoothing engine for smoothing the plurality of scores associated with the nodes of the hierarchy using generalized isotonic regression; and
   a storage operably coupled to the isotonic smoothing engine for storing the plurality of scores associated with the nodes of the hierarchy,
   wherein the isotonic smoothing engine for smoothing the plurality of scores associated with the nodes of the hierarchy using generalized isotonic regression comprises an isotonic smoothing engine for smoothing a plurality of templateness scores associated with nodes of a web page using generalized isotonic regression on a tree.

3. A non-transitory computer-readable medium comprising executable instructions, operable when executed by one or more processors to:
   maintain a plurality of scores associated with nodes of a hierarchy;
   smooth the plurality of scores associated with the nodes of the hierarchy using generalized isotonic regression; and
   store the plurality of scores associated with the nodes of the hierarchy,
   wherein storing the plurality of scores associated with the nodes of the hierarchy comprises storing a plurality of templateness scores associated with DOM nodes of a web page.

* * * * *